United States Patent [19]

Gaetano et al.

[11] 4,147,900
[45] Apr. 3, 1979

[54] TELEPHONE NETWORK PROTECTIVE COUPLER

[75] Inventors: Mauro L. Gaetano, Woodbridge, Va.; Ambroz K. Skrovanek, Bethesda, Md.

[73] Assignee: Harvey Hubbell Incorporated, Bridgeport, Conn.

[21] Appl. No.: 785,680

[22] Filed: Apr. 7, 1977

[51] Int. Cl.$^2$ .............................................. H04B 3/08
[52] U.S. Cl. ............................... 179/170 R; 179/1 A; 179/81 B; 330/138
[58] Field of Search ............... 179/170 R, 1 C, 1 HF, 179/2 C, 81 B, 170 D, 170 T, 170 NC, 16 F, 184, 1 VL, 1 A, 1 F; 323/9; 330/138, 279, 207 P

[56] References Cited

U.S. PATENT DOCUMENTS

| 3,558,830 | 1/1971 | Bender | 179/184 |
|---|---|---|---|
| 3,781,481 | 12/1973 | Shaffer et al. | 179/170 R |
| 3,903,378 | 9/1975 | Lee et al. | 179/170 R |
| 3,914,560 | 10/1975 | Greene | 179/170 R |
| 3,925,624 | 12/1975 | Earle et al. | 179/81 R |
| 3,989,902 | 11/1976 | Cowpland | 179/16 F |
| 4,024,346 | 5/1977 | McDermott | 179/170 R |

*Primary Examiner*—Kathleen H. Claffy
*Assistant Examiner*—Randall P. Myers
*Attorney, Agent, or Firm*—Oblon, Fisher, Spivak, McClelland & Maier

[57] ABSTRACT

A telephone network protective coupler for connecting terminal equipment to a telephone central office by means of a telephone line. The coupler includes two hybrid circuits which are interconnected to form a transmitting path and a receiving path. A power limiter in the transmitting path can be programmed remotely by selection of an external programming resistor without the direct introduction of noise into the transmitting path. The programming feature permits the gain of the transmitting portion of the device to be varied in steps from 0 to −12dB., and the maximum power output to be varied correspondingly in steps from 0 to −12 dBm. in order to arrive at an optimum signal power level of −12dBm. at the central office. The power limiter includes a controller gain amplifier for varying the attenuation of the transmitting path to a.c. signals, a remotely adjustable attenuator connected to a d.c. voltage source, and a gain control circuit connected to the amplifier and to the attenuator and responsive to adjustment of the attenuator for controling the gain of the amplifier. The power limiter further includes a rectifier for rectifying the a.c. signals after passage through the amplifier, and a maximum power control circuit connected to the rectifier and the attenuator and responsive to the adjustment of the attenuator for keeping the ratio of the amplitude of the rectified a.c. signals to the output voltage of the attenuator less than or substantially equal to a fixed constant.

36 Claims, 2 Drawing Figures

TELEPHONE NETWORK PROTECTIVE COUPLER

BACKGROUND OF THE INVENTION

1. Field of the Invention

This invention relates to couplers for interfacing the telephone network with terminal equipment and more particularly to such couplers incorporating signal power limiting. The invention further concerns a process for limiting the signal power transmitted to the telephone network by terminal equipment interfaced therewith.

2. Description of the Prior Art

Federal Communications Commission Rules Part 68 entitled "Connection of Terminal Equipment to the Telephone Network" provide uniform standards for the protection of the telephone network from harm caused by the connection of terminal equipment thereto. When a customer desires to connect terminal equipment which has been registered, he is required to notify the telephone company of each telephone line to which he intends to connect such equipment. The telephone company, after determining the attenuation of each such telephone line between the interface and the telephone company central office, will make such connections as are necessary in each so-called programmed data jack which it will install at the interface, so as to allow the maximum signal power delivered by such terminal equipment to the telephone company central office to reach, but not exceed, the maximum allowable signal power permitted at the telephone company central office.

The programmed data jack incorporates a programming resistor. The proper programming resistor (Rp) is to be selected by the telephone company at the time of installation based upon the loop loss of the telephone line to program the signal power output of the terminal equipment so as to arrive at an optimum signal power level of $-12$ dBm at the central office. Table 1 reproduced from the Federal Register Vol. 41, No. 134 (July 12, 1976) gives the required resistance value for the programming resistor for each value of the desired signal power level in dBm.

TABLE 1

| Programming Resistor (Rp) | Programmed Data Equipment Signal Power Output |
|---|---|
| short | 0 dBm |
| 150 ohms | $-1$ dBm |
| 336 ohms | $-2$ dBm |
| 569 ohms | $-3$ dBm |
| 866 ohms | $-4$ dBm |
| 1,240 ohms | $-5$ dBm |
| 1,780 ohms | $-6$ dBm |
| 2,520 ohms | $-7$ dBm |
| 3,610 ohms | $-8$ dBm |
| 5,490 ohms | $-9$ dBm |
| 9,200 ohms | $-10$ dBm |
| 19,800 ohms | $-11$ dBm |
| open | $-12$ dBm |

Terminal couplers are known which provide means whereby customer-provided automatic terminal equipment may be connected to the switched telecommunications network for data and voice communications. One such coupler is manufactured by the Elgin Electronics Inc. as the EDC 1001 A Automatic Data Coupler and described in Elgin System Practice Bulletin 20011 (July 1972), Issue 3. When the connections are completed, the data coupler must be adjusted internally to limit the customer signal power to a level which will not exceed a $-12$ dBm signal level at the serving central office.

The prior art connected the programming resistor directly into the telephone line as a part of an attenuator. The disadvantage with this arrangement is that with the resistor in the signal line bidirectional attenuation results, that is, both the received and transmitted signals are attenuated. Moreover, any noise induced into the attenuator leads will be added to the throughgoing signal.

No terminal coupler is known where the programmable resistor controls only the transmitted signal and/or the programming resistor is not part of the signal circuit.

SUMMARY OF THE INVENTION

It is therefore one object of the present invention to provide a telephone network protective coupler for connecting terminal equipment to a central office by means of a telephone line which can be remotely adjusted to limit the transmitted signal power on the line.

It is another object of the present invention to provide a telephone network protective coupler for connecting terminal equipment to a central office by means of a telephone line which can be remotely adjusted to control the transmitted signal level on the line.

It is a yet further object of the present invention to provide a telephone network protective coupler for connecting terminal equipment to a central office by means of a telephone line which can be remotely adjusted to limit the transmitted signal power and to control the signal level without introducing noise into the signal path.

It is yet another object of the present invention to provide an improved method for limiting the signal power transmitted to a telephone network central office by terminal equipment attached to a telephone line.

The objects of the present invention are achieved by a telephone network protective coupler for connecting terminal equipment to a central office by means of a telephone line. The device includes two hybrids which are interconnected to form a transmitting path and a receiving path. A power limiter in the transmitting path can be programmed remotely by selection of an external programming resistor without the direct introduction of noise into the transmitting path. The programming feature permits the gain of the transmitting portion of the device to be varied in steps from 0 to $-12$ dB., and the maximum power output to be varied correspondingly in steps from 0 to $-12$ dBm. in order to arrive at an optimum signal power level of $-12$ dBm. at the central office. The power limiter includes a controlled gain amplifier for varying the attenuation of the transmitting path to a.c. signals, a remotely adjustable attenuator connected to a d.c. voltage source, and a gain control circuit connected to the amplifier and to the attenuator and responsive to adjustment of the attenuator for controlling the gain of the amplifier. The power limiter further includes a rectifier for rectifying the a.c. signals after passage through the amplifier, and a maximum power control circuit connected to the rectifier and the attenuator and responsive to the adjustment of the attenuator for keeping the ratio of the amplitude of the rectified a.c. signals to the output voltage of the attenuator less than or substantially equal to a fixed constant.

In another aspect, the present invention involves a method of limiting the signal power transmitted to a telephone network central office by terminal equipment attached to a telephone line. This method comprises the steps of providing a controlled gain amplifier for varying the attenuation of the transmitting path to a.c. signals, remotely adjusting an attenuator connected to a d.c. voltage source, and controlling the gain of the amplifier in response to the adjustment of the attenuator. The method further includes the steps of rectifying the a.c. signals after passage through the amplifier, and keeping the ratio of the amplitude of the rectified a.c. signals to the output voltage of the attenuator less than or substantially equal to a fixed constant in response to the adjustment of the attenuator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
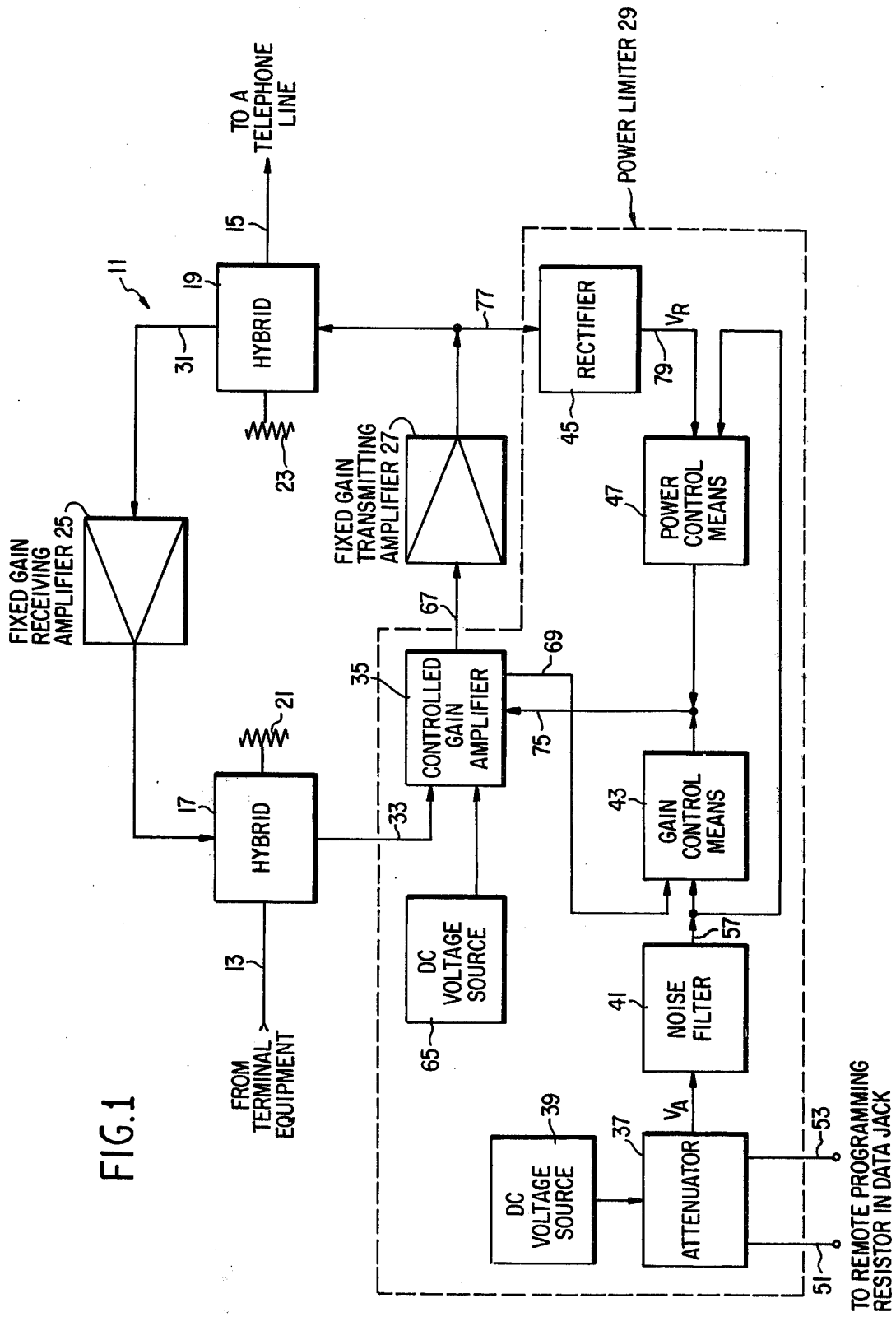
FIG. 1 is a block diagram of a preferred embodiment of the telephone network protective coupler of the invention.

Referring now to the drawings, wherein like reference numerals designate identical or corresponding parts, and more particularly to FIG. 1 thereof, there is shown a schematic block diagram of a telephone network protective coupler 11 for attaching subscriber provided terminal equipment to a telephone line. The terminal equipment and hence device 11 is located at the subscriber station. Line 13 represents the incoming connection from the terminal equipment. Line 15 represents the outgoing connection from the coupler 11 via the subscriber loop to the central office.

The coupler 11 is connected to and isolated from incoming line 13 and outgoing line 15 through first and second hybrid circuits 17 and 19 also called two-wire-four-wire terminating sets which are well known in the art. In telephone transmission circuits a hybrid circuit is a circuit for interconnecting two-wire and four-wire circuits through a differential balance or bridge circuit in which the two sides of the four-wire circuit form the diagonals. Balancing circuit networks 21 and 23, which are also known in the art, provide a compromise impedance match to the impedance of lines 13 and 15 respectively. The two wire side terminals of the first hybrid circuit 17 are connected to the terminal equipment. The 4-wire side terminal pairs of the first hybrid circuit 17 are connected to the 4-wire side terminal pairs of the second hybrid circuit 19 through conventional fixed gain amplifiers 25 and 27 and a power limiter 29. The two wire side terminals of the second hybrid circuit 19 are connected to the conductors of the telephone line. Two-wire connections 31 and 33, respectively, represent the receiving path for signals from the central office to the terminal equipment, and the transmitting path for signals from the terminal equipment to the central office. The signal received by the terminal equipment is usually weaker than the transmitted signal and therefore it is inadvisable to subject it to further attenuation.

The power limiter 29 is remotely controllable from the interface for limiting the signal power delivered by the terminal equipment to the central office via the transmitting path.

As previously discussed, the signal power delivered by the terminal equipment to the central office must not exceed $-12$ dBm. The power limiter 29 is responsive to the selection of a remote programming resistor for varying the gain of the transmitting portion of the device in steps 1 dB from 0 to $-12$ dB as indicated by TAble 1 and the maximum power output in steps from 0 to $-12$ dBm. to satisfy this requirement.

The power limiter 29 includes a controlled gain amplifier 35 connected between the hybrid 17 and the fixed gain transmitting amplifier 27 for varying the attenuation of the transmitting path to a.c. signals in the telephone band which are typically 300–3500 Hz in frequency from the terminal equipment. A d.c. voltage source 65 supplies a reference input to the controlled gain amplifier 35. In practice the gain of the controlled gain amplifier will be less than one. An attenuator 37 is connected to a d.c. voltage source 39, and is programmed by adjusting the value of an external programming resistor in a data jack at a remote location. The value of the programming resistor is selected by the telephone company at the time of installation of the coupler 11 into the telephone network. According to the value selected, the d.c. power output from the attenuator 37 can be programmed for one of twelve steps between 0 and $-12$ dB. The output of the attenuator 37 is passed through a noise filter 41 which removes noise coupled into the attenuator 37 via the leads of the remote programming resistor. A gain control means 43 is connected between the controlled gain amplifier 35 and the attenuator 37 and is responsive to the programming of the attenuator for controlling the a.c. gain G of the controlled gain amplifier.

The power loss in the transmitting path between the two hybrids can be expressed by forming the algebraic sum of the losses in dB encountered by the a.c. signals traversing it. This sum includes the controlled variable loss in dB., 20 log G, of the controlled gain amplifier 35 plus a constant term in dB, 20 log $c_1$, where $c_1$ is a fixed constant, resulting from losses of the fixed gain transmitting amplifier 27 and the hybrid circuits 17 and 19, and can be represented by formula A, namely $$20 \log G + 20 \log c_1 = P_A \tag{A}$$

$P_A$ is the programmed attenuation of the coupler in dB. On the other hand, the voltage loss of the attenuator 37 can be expressed in terms of its attenuation constant k which is determined by the value of the programming resistor, and can be represented by formula B, namely $$20 \log (k) = P_A \tag{B}$$

Since $P_A$ ranges between 0 and $-12$ dB, k has values between 1 and 0.14. The gain control means 43 keeps the ratio of the a.c. gain G of the controlled gain amplifier 35 to the attenuation k of the attenuator 37 equal to a fixed constant, according to the equality represented by formula C, namely $$(G/k) = (1/c_1) \tag{C}$$

so that the power loss of the transmitting path as represented by formula A is matched to the power loss of the attenuator as represented by formula B.

In this manner, whatever step in the range of 0 and −12 dBm is programmed into the attenuator, the same step is remotely programmed into the transmitting portion of the coupler 11. It will be readily seen that this offers the advantage that the gain of the telephone network protective coupler 11 can be remotely controlled without the direct introduction of noise into the a.c. signal path via the leads of an external programming means.

Referring again to FIG. 1, the power limiter 29 further includes a rectifier 45 connected to the output of the fixed gain transmitting amplifier 27 for rectifying the a.c. signals after passage through the controlled gain amplifier 35. A maximum power control means 47 receives inputs from the rectifier 45 and the attenuator 37 via the noise filter 41. The maximum power control means 47 is responsive to the programming of the attenuator 37 for keeping the ratio of the amplitude of the rectified a.c. signals $V_R$ to the output voltage $V_A$ of the attenuator less than or substantially equal to a fixed constant according to formula D, namely $$(V_R/V_A) \leq c_2 \tag{D}$$

The maximum power control means 47 overrides the gain control means 43 when the input signals from the terminal equipment to the coupler 11 exceed 1 milliwatt, and further reduces the gain of the controlled amplifier 35. The fixed constant $c_2$ is chosen so that the amplitude of the rectified a.c. signals is limited to the value of the output voltage of the attenuator 37 for a 1 milliwatt input to the attenuator. In this manner the output of the coupler is limited to a signal power equal to the step in the range of 0 to −12dBm. programmed into the attenuator.

The primary embodiment of this invention is more particularly described with reference to FIG. 2 which shows a schematic circuit diagram of the power limiter 29 of the telephone network protective coupler 11 of this invention. The circuits outlined in FIG. 2 with broken lines carry the same reference numbers as the blocks in FIG. 1.

The attenuator 37 comprises a resistance network including resistor $R_2$ and of the type described in the Federal Register Vol. 41, No. 134 which can be programmed to provide a signal output in 12 steps between 0 dB. and −12dB. The programming is accomplished by inserting an appropriate programming resistor across terminals 51 and 53 at the remote location. For purposes of example, when $R1=R3=600\Omega$ and $R2=3600\Omega$ Table 1 can be used for determining the correspondence between the selected programming resistor and the power output of the resistance network. The attenuator 37 is connected at its input to the negative terminal of the d.c. voltage source 39.

The output of the attenuator 37 feeds the noise filter 41 including a resistor R4 and a capacitor C1 which removes noise coupled into the attenuator via the leads of the programming resistor. The filtered signal is then amplified in a buffer amplifier 55, polarity inverted and coupled to the gain control means 43 via lead 57.

The controlled gain amplifier 35 can be a conventional type of operational amplifier 59 having resistors R7, R8, R9 and Rph respectively as part of an a.c. gain G determining network and resistors R8, R9, R10 and Rph respectively as a part of a d.c. gain g determining network thereof. The common feedback resistance can be computed by formula (E), namely $$R_f = R_9 + R_8 R_{ph}/(R_8 + R_{ph}) \tag{E}$$

The a.c. gain is represented by formula (F), namely $$G = R_f/R_7 \tag{F}$$

The d.c. gain is represented by formula (G), namely $$g = R_f/R_{10} \tag{G}$$

A controlled resistance element in the form of a photoconductive cell 61 is connected in parallel with the resistance R8 of the amplifier 59. A lamp 63 is focused on the photoconductive cell 61 to alter the resistance Rph of the cell. The inverting input terminal of the amplifier 59 is a.c. coupled to the transmitting path and connection 33 via capacitor C2, and d.c. coupled to the positive pole of the battery 65 via the resistor R10. The battery 65 also powers the lamp 63. The output of the amplifier 59 is a.c. coupled to the fixed gain transmitting amplifier 27 in the transmitting path via capacitor C3 and d.c. coupled to the gain control means via lead 69.

The gain control means 43 consists of a error amplifier 71 which feeds a lamp driver Q1. The d.c. output voltages from the controlled gain amplifier 35 and the attenuator 37 are applied to the inverting input terminal of a summing amplifier 73 through resistors R11 and R12 respectively, which form a simple summing network. The combined (summed) input is integrated by the capacitor C4 in conjunction with the summing amplifier 73 to produce an output voltage which controls the operating point of normally on lamp driver Q1 which is coupled to the controlled gain amplifier via lead 75. Lamp driver Q1 comprises an NPN transistor having its emitter connected to ground via resistor R13. Resistor R14 provides a bias current for the lamp. The emitter of Q1 is also coupled to the inverting input terminal of the summing amplifier 73 via a resistor R15 and capacitor C5 to prevent loop oscillations. Zener diode Z1 is provided to limit the range of variation of the current passing through lead 75 which controls the resistance Rph of the cell, and thus the gain excursion.

The rectifier 45 is of conventional feedback diode design and serves to rectify the a.c. signals after passage through the controlled gain amplifier 35 and the fixed gain transmitting amplifier 27. Its output is coupled to the power control means 47 via lead 79.

The power control means 47 consists of another error amplifier 81 feeding a lamp driver Q2. The d.c. output voltages from the rectifier 45 and the attenuator 37 (via noise filter 41) are applied to the input of the summing amplifier 83 through resistors R19 and R20 forming a summing network. The combined (summed) output is integrated by the capacitor C7 in conjunction with the summing amplifier 83 to produce an output voltage which turns on normally cutoff lamp driver Q2 which is also coupled to the controlled gain amplifier 35 via lead 75. Lamp driver Q2 comprises an NPN transistor having its emitter connected to ground via resistor R23. The emitter of Q2 is also coupled to the inverting input terminal of the summing amplifier 83 via a resistor R22 and capacitor C6 to prevent loop oscillations. Zener diode Z2 is provided to limit the range of variation of the current passing through lead 75 which controls the resistance Rph of the cell, and thus the gain excursion.

In operation, the controlled gain amplifier 35 multiplies the constant voltage of battery 65 by the d.c. gain g and applies it to the inverting input terminal of the summing amplifier 73 through the resistor R11 as a first input current. The attenuator 37 and the noise filter 41 multiply the constant voltage of d.c. voltage source 39 by a factor proportional to the attenuation constant k and also apply it to the inverting input terminal of the summing amplifier 73 through resistor R12 as a second input current of opposite polarity to the first input current. As noted above, the a.c. gain G and the d.c. gain g are intimately related by formulas F and G. Therefore, whenever the d.c. gain is changed, the a.c. gain experiences the same change in dB. The values of the resistors R7, R10, R11 and R12 are selected so that the two currents cancel when the equality represented by formula C is maintained, that is, when the ratio of the a.c. gain G of the controlled gain amplifier 35 to the attenuation factor k of the attenuator 37 is equal to a predetermined fixed constant $c_1$ whose value is dependent upon the losses in the fixed gain amplifier 27 and the hybrid circuits 17 and 19. If the d.c. gain g is too low or too high, an error signal proportional to the difference in the two currents is applied to the base of the lamp driver Q1, shifting its operating point to vary the resistance of the controlled resistance element 61 until the a.c. gain G of the controlled gain amplifier 35 takes on a value to satisfy formula C. Thus, the error amplifier 71 compares the gain of the controlled gain amplifier 35 to the attenuation of the attenuator 37 and the lamp driver Q1 contols the resistance Rph of the controlled resistance element 61 to keep the ratio of the a.c. gain of the amplifier to the attenuation of the attenuator equal to the fixed constant.

In the meantime, the rectifier 45 rectifies the voltage of the a.c. signals after passage through the controlled gain amplifier 35 and the fixed gain amplifier 27 to provide the voltage $V_R$ and applies it to the inverting input terminal of the summing amplifier 83 through resistance R19 as a first input current. The attenuator 37 multiplies the constant voltage of the d.c. voltage source 39 by the attenuation constant k to provide the reference voltage $V_A$ and apply it through the noise filter 41 to the inverting input terminal of the summing amplifier 83 through resistor R20 as a second input current. The value of the resistors R19 and R20 are selected so that the two currents cancel when the equality represented by formula H is maintained, namely $$(V_R/V_A) = c_2 \tag{H}$$

that is, when the amplitude (average value) of the rectified a.c. signals equals the value of the output voltage of the attenuator for a 1 milliwatt input to the attenuator. If the input signals from the terminal equipment to the device 11 exceed 1 milliwatt, that is, if the inequality represented by formula I holds, namely $$(V_R/V_A) > c_2 \tag{I}$$

an error signal proportional to the difference in the two currents turns on lamp driver Q2 which has been biased to cutoff. Q2 now overrides the action of lamp driver Q1 and further reduces the resistance of the controlled resistance element 61 until the a.c. gain G of the controlled gain amplifier 35 takes on a value to satisfy formula D. Thus, the error amplifier 83 compares the amplitude of the rectified a.c. signals to the output voltage of the attenuator, and the lamp driver Q2 controls the resistance of the controlled resistance element to keep the ratio of the amplitude of the rectified a.c. signals to the output voltage of the attenuator less than or substantially equal to a fixed constant.

Obviously, numerous modifications and variations of the present invention are possible in light of the above teachings. For example, one possible variation is to use either a thermistor, a magnetoresistor, a field effect transistor, or a diode in place of the photoconductive cell as the controlled resistance element. It is therefore to be understood that within the scope of the appended claims, the invention may be practiced otherwise than as specifically described.

What is claimed as new and desired to be secured by Letters Patent of the United States is:

1. A telephone network protective coupler for connecting terminal equipment to a central office by means of a telephone line comprising:
   first and second hybrids;
   the 2-wire side terminal pair of the first hybrid adapted to be coupled to the terminal equipment and the 2-wire side terminal pair of the second hybrid adapted to be coupled to the conductors of the telephone line;
   the first terminal pair of the 4-wire side terminal pairs of the first hybrid being connected to the first terminal pair of the 4-wire side terminals of the second hybrid to form a receiving path for signals from the central office to the terminal equipment;
   the second terminal pair of the 4-wire side terminal pairs of the first hybrid being connected to the second terminal pair of the 4-wire side terminals of the second hybrid to form a transmitting path for signals from the terminal equipment to the central office: and
   means for limiting the signal power delivered by the terminal equipment to the central office; wherein the limiting means includes
   a controlled gain amplifier disposed in the transmitting path for varying the attenuation of a.c. signals on the transmitting path;
   an attenuator disposed externally of the transmitting path and having an attenuation set to a predetermined value;
   means for connecting the attenuator to a d.c. voltage source;
   a rectifier disposed externally of the transmitting path for rectifying the a.c. signals after passage through the amplifier; and
   maximum power control means connected to the rectifier and to the attenuator for keeping the ratio of the amplitude of the rectified a.c. signals to the output voltage of the attenuator less than or substantially equal to a fixed constant and further connected to said amplifier for controlling the gain thereof.

2. The telephone network protective coupler recited in claim 1 wherein the limiting means further includes;
   gain control means connected to the amplifier and to the attenuator for controlling the gain of the amplifier.

3. The telephone network protective coupler recited in claim 2, wherein the controlled gain amplifier includes:
   a feedback network having a controlled resistance element therein, the gain of the amplifier being dependent on the resistance of the controlled resistance element.

4. The telephone network protective coupler recited in claim 3 wherein the maximum power control means includes:
 amplitude comparing means connected to the rectifier and to the attenuator for comparing the amplitude of the rectified a.c. signals to the output voltage of the attenuator; and
 means connected to the controlled resistance element and operated by the amplitude comparing means for controlling the resistance of the controlled resistance element to keep the ratio of the amplitude of the rectified a.c. signals to the output voltage of the attenuator less than or substantially equal to a fixed constant.

5. The telephone network protective coupler recited in claim 3 wherein the maximum power control means includes:
 amplitude comparing means connected to the rectifier and to the attenuator for comparing the amplitude of the rectified a.c. signals to the output voltage of the attenuator; and
 means connected to the controlled resistance element and operated by the amplitude comparing means for controlling the resistance of the controlled resistance element to keep the power delivered to the telephone line in dB. relative to 1 milliwatt less than or substantially equal to the power loss of the attenuator.

6. The telephone network protective coupler recited in claim 4 wherein the amplitude comparing means comprises an error amplifier.

7. The switched network attachment device recited in claim 4 wherein the controlled resistance element comprises a photoconductive cell coupled to a lamp; and
 the resistance controlling means comprises a lamp driver.

8. The telephone network protective coupler recited in claim 2 wherein the controlled gain amplifier includes:
 a feedback network having
 a controlled resistance element therein, the gain of the amplifier being dependent on the resistance of the controlled resistance element.

9. The telephone network protective coupler recited in claim 8 wherein the gain control means includes:
 gain comparing means connected to the output of the amplifier and to the attenuator for comparing a signal indicative of the gain of the amplifier to a signal indicative of the attenuation of the attenuator; and
 means connected to the controlled resistance element and operated by the gain comparing means for controlling the resistance of the controlled resistance element to keep the ratio of the gain of the amplifier to the attenuation of the attenuator constant.

10. The telephone network protective coupler recited in claim 9 wherein the gain comparing means comprises an error amplifier.

11. The telephone network protective coupler recited in claim 9 wherein the controlled resistance element comprises a photoconductive cell coupled to a lamp; and
 the resistance controlling means comprises a lamp driver.

12. The telephone network protective coupler recited in claim 1 wherein the maximum power control means is responsive to adjustment of the attenuator for keeping the power delivered to the telephone line in dB. relative to 1 milliwatt less than or substantially equal to the power loss of the attenuator.

13. The switched network attachment device recited in claim 1 wherein the attenuator includes:
 a resistance network.

14. The telephone network protective coupler recited in claim 1 including:
 a noise filter coupled between the attenuator and the gain control means.

15. A method for limiting the signal power transmitted to a telephone central office by terminal equipment attached to a telephone line,
 comprising the steps of:
 connecting the terminal equipment to the telephone line by means of a four-wire transmission network which includes noncoincident receive and transmit paths for respectively receiving a.c. signals from and transmitting a.c. signals to the central office;
 incorporating a controlled gain amplifier in the transmit path for varying the attenuation of a.c. signals transmitted to the telephone central office;
 disposing externally of the transmit path an attenuator connected to a d.c. voltage source;
 setting to a predetermined value that attenuation of the attenuator;
 rectifying externally of the transmit path the a.c. signals after passage through the amplifier; and
 keeping the ratio of the amplitude of the rectified a.c. signals to the output voltage of the attenuator less than or substantially equal to a fixed constant by controlling the gain of said amplifier.

16. The method recited in claim 15 including the steps of:
 controlling the gain of amplifier in response to the setting of the attenuator.

17. The method recited in claim 15 including the step of: keeping the power output of the amplifier in dB. relative to 1 milliwatt less than or substantially equal to the power loss of the attenuator in response to adjustment of the attenuator.

18. The method recited in claim 15 including the step of:
 filtering noise coupled into the attenuator.

19. A method for limiting the signal power transmitted to a telephone network central office by terminal equipment attached to a telephone line,
 the method comprising the steps of:
 connecting the terminal equipment to the telephone line by means of a four-wire transmission network which includes noncoincident receive and transmit paths for respectively receiving a.c. signals from and transmitting a.c. signals to the central office;
 incorporating in the transmit path for varying the attenuation of a.c. signals transmitted to the telephone central office a controlled gain amplifier which includes a feedback network having a controlled resistance element therein, the gain of the amplifier being dependent on the resistance of the controlled resistance element;
 disposing externally of the transmit path an attenuator connected to a d.c. voltage source;

setting to a predetermined value the attenuation of the attenuator;

rectifying externally of the transmit path the a.c. signals after passage through the amplifier; and controlling the resistance of the controlled resistance element to keep the ratio of the amplitude of the rectified a.c. signals to the output voltage of the attenuator less than or substantially equal to a fixed constant.

20. The method recited in claim 19 including the steps of:

controlling the resistance of the controlled resistance element to keep the ratio of the gain of the amplifier to the attenuation of the attenuator constant.

21. The method recited in claim 19 including the steps of:

comparing the amplitude of the rectified a.c. signals to the output voltage of the attenuator; and controlling the resistance of the controlled resistance element to keep the power output of the amplifier in dB. relative to 1 milliwatt less than or substantially equal to the power loss of the attenuator.

22. The method recited in claim 19 including the step of:

filtering noise coupled into the attenuator.

23. A telephone network protective coupler for connect-terminal equipment to a central office by means of a telephone line comprising:

a four-wire transmission network including noncoincident receive and transmit paths for respectively receiving a.c. signals from and transmitting a.c. signals to the central office, a controlled gain amplifier connected in the transmit path for varying the attenuation of a.c. signals transmitted to the central office;

an attenuator disposed externally of the transmit path and having an attenuation set to a predetermined value;

means for connecting the attenuator to a d.c. voltage source;

a rectifier disposed externally of the transmit path for rectifying a.c. signals after passage through the amplifier; and maximum power control means connected to the rectifier and to the attenuator for keeping the ratio of the amplitude of the rectified a.c. signals to the output voltage of the attenuator less than or substantially equal to a fixed constant and further connected to said amplifier for controlling the gain thereof.

24. The telephone network protective coupler recited in claim 23 further including:

gain control means connected to the amplifier and to the attenuator for controlling the gain of the amplifier.

25. The telephone network protective coupler recited in claim 24 wherein the controlled gain amplifier includes:

a feedback network having a controlled resistance element therein, the gain of the amplifier being dependent on the resistance of the controlled resistance element.

26. The telephone network protective coupler recited in claim 25 wherein the maximum power control means includes:

amplitude comparing means connected to the rectifier and to the attenuator for comparing the amplitude of the rectified a.c. signals to the output voltage of the attenuator; and means connected to the controlled resistance element and operated by the amplitude comparing means for controlling the resistance of the controlled resistance element to keep the ratio of the amplitude of the rectified a.c. signals to the output voltage of the attenuator less than or substantially equal to a fixed constant.

27. The telephone network protective coupler recited in claim 25 wherein the maximum power control means includes:

amplitude comparing means connected to the rectifier and to the attenuator for comparing the amplitude of the rectified a.c. signals to the output voltage of the attenuator; and means connected to the controlled resistance element and operated by the amplitude comparing means for controlling the resistance of the controlled resistance element to keep the power output of the amplifier in dB. relative to 1 milliwatt less than or substantially equal to the power loss of the attenuator.

28. The telephone network protective coupler recited in claim 26 wherein the amplitude comparing means comprises an error amplifier.

29. The telephone network protective coupler recited in claim 26, wherein the controlled resistance element comprises a photoconductive cell coupled to a lamp; and the resistance controlling means comprises a lamp driver.

30. The telephone network protective coupler recited in claim 24 wherein the controlled gain amplifier includes:

a feedback network having a controlled resistance element therein, the gain of the amplifier being dependent on the resistance of the controlled resistance element.

31. The telephone network protective coupler recited in claim 30 wherein the gain control means includes:

gain comparing means connected to the controlled gain amplifier and to the attenuator for comparing a signal indicative of the gain of the amplifier to a signal indicative of the attenuation of the attenuator; and means connected to the controlled resistance element and operated by the gain comparing means for controlling the resistance of the controlled resistance element to keep the ratio of the gain of the amplifier to the attenuation of the attenuator constant.

32. The telephone network protective coupler recited in claim 31 wherein the gain comparing means comprises an error amplifier.

33. The telephone network protective coupler recited in claim 31 wherein the controlled resistance element comprises a photoconductive cell coupled to a lamp; and the resistance controlling means comprises a lamp driver.

34. The telephone network protective coupler recited in claim 23 wherein the maximum power control means is responsive to adjustment of the attenuator for keeping the power output of the amplifier in dB. relative to 1 milliwatt less than or substantially equal to the power loss of the attenuator.

35. The telephone network protective coupler recited in claim 23 wherein the attenuator includes:

a resistance network.

36. The telephone network protective coupler recited in claim 23 including:

a noise filter coupled between the attenuator and the gain control means.

* * * * *

UNITED STATES PATENT AND TRADEMARK OFFICE
CERTIFICATE OF CORRECTION

PATENT NO. : 4,147,900

DATED : April 3, 1979

INVENTOR(S) : Mauro Gaetano et al.

Figure 2:
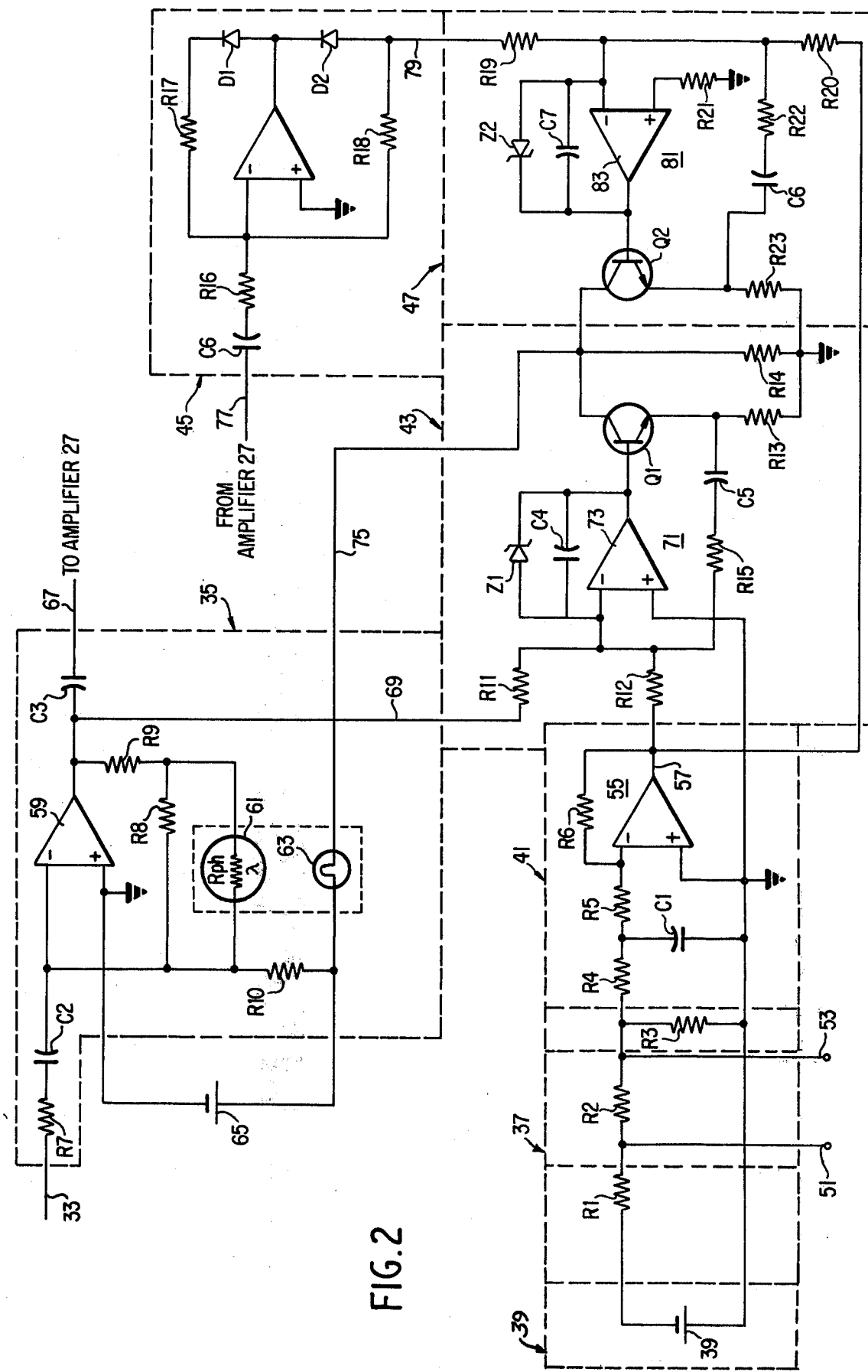
FIG. 2 shows a schematic circuit diagram of the power limiter of the preferred embodiment of the telephone network protective coupler of the invention.
Figure 2:
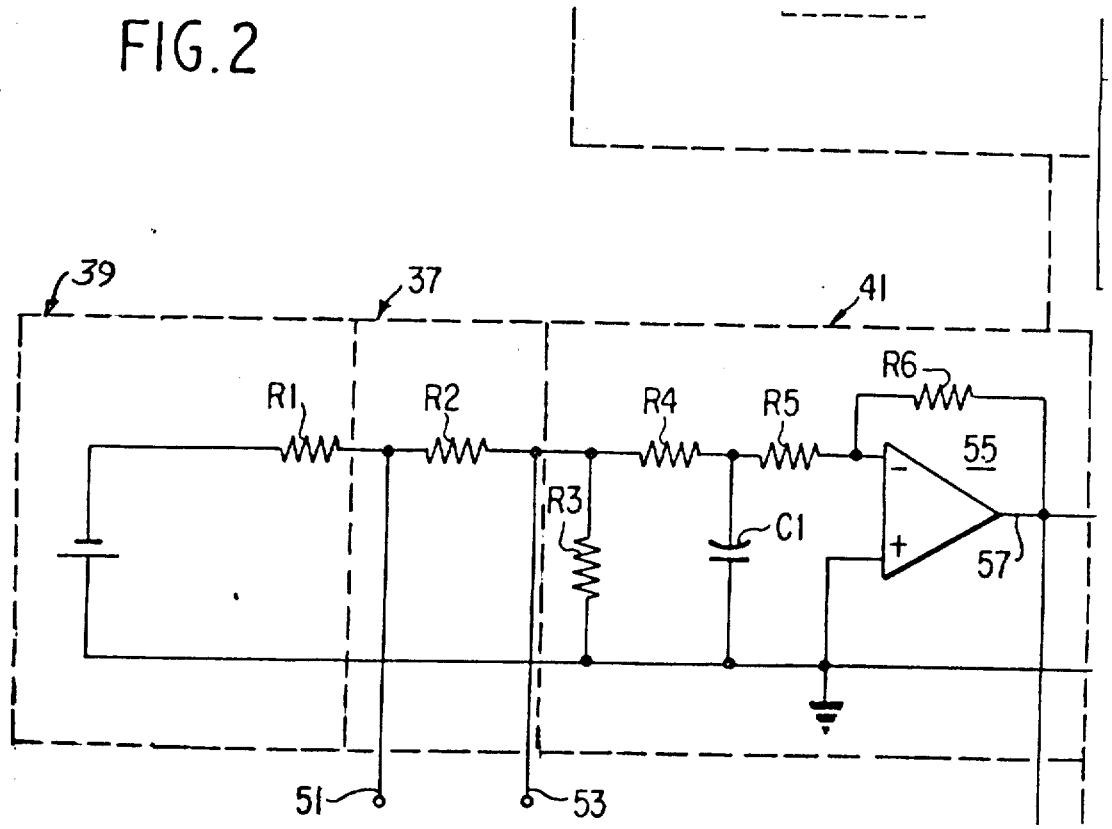

It is certified that error appears in the above-identified patent and that said Letters Patent are hereby corrected as shown below:

Figure 2 should appear as shown on the attached sheet.

Signed and Sealed this

Twenty-third Day of October 1979

[SEAL]

Attest:

RUTH C. MASON
Attesting Officer

LUTRELLE F. PARKER
Acting Commissioner of Patents and Trademarks